US012705218B2

(12) United States Patent
Ahmadi et al.

(10) Patent No.: US 12,705,218 B2
(45) Date of Patent: Aug. 11, 2026

(54) BUILT-IN DATA QUALITY MONITORING

(71) Applicant: Snowflake Inc., Bozeman, MT (US)

(72) Inventors: Hossein Ahmadi, Seattle, WA (US); Raja Suresh Krishna Balakrishnan, Fremont, CA (US); David Schultz, Piedmont, CA (US); Jian Xu, San Jose, CA (US); Yunqiao Zhang, Bellevue, WA (US)

(73) Assignee: Snowflake Inc., Bozeman, MT (US)

(*) Notice: Subject to any disclaimer, the term of this patent is extended or adjusted under 35 U.S.C. 154(b) by 0 days.

(21) Appl. No.: 18/326,158

(22) Filed: May 31, 2023

(65) Prior Publication Data

US 2024/0403276 A1 Dec. 5, 2024

(51) Int. Cl.
*G06F 16/215* (2019.01)
*G06F 16/22* (2019.01)

(52) U.S. Cl.
CPC ........ *G06F 16/215* (2019.01); *G06F 16/2282* (2019.01)

(58) Field of Classification Search
CPC ........................... G06F 16/215; G06F 16/2282
See application file for complete search history.

(56) References Cited

U.S. PATENT DOCUMENTS 6,366,915 B1 * 4/2002 Rubert .................... G06F 16/25 707/999.009
10,628,394 B1 * 4/2020 Gurspan ............... G06F 16/214
11,663,208 B2 * 5/2023 Kent, IV ................... G06F 8/60 707/692
11,797,521 B1 * 10/2023 Vig ....................... G06F 16/245
12,248,448 B1 3/2025 Balakrishnan et al.
2005/0149580 A1 * 7/2005 Hattori .................... H04L 67/75
2008/0071825 A1 3/2008 Guo
2009/0083310 A1 * 3/2009 Ballerini ................. G06F 16/21 707/999.102
2010/0166008 A1 7/2010 Hashimoto et al.
2012/0323947 A1 * 12/2012 Bice .................... G06F 16/2425 707/769
2014/0081907 A1 3/2014 Tran et al.
2015/0142775 A1 5/2015 Kang et al.
2016/0232200 A1 * 8/2016 Sherman ............. G06F 16/2379
2016/0266920 A1 * 9/2016 Atanasov .............. G06F 11/301
2018/0096044 A1 4/2018 Koza
2019/0163773 A1 * 5/2019 Sun ..................... G06F 16/2282

(Continued)

OTHER PUBLICATIONS

"U.S. Appl. No. 18/451,522, Notice of Allowance mailed Jan. 23, 2025", 9 pages.

(Continued)

*Primary Examiner* — Hares Jami
(74) *Attorney, Agent, or Firm* — Schwegman Lundberg & Woessner, P.A.

(57) ABSTRACT

Described herein are techniques for data quality monitoring in a network-based data system. A data metric function used to evaluate data quality can be stored, where the data metric function is defined as schema level object. The data metric function can be attached to a table associated with an account and is evaluated on data associates with the table to generate evaluation results. The evaluation results can be stored in an account-specific central database, from which access is provided to the evaluation results to a user for the account.

18 Claims, 7 Drawing Sheets

(56) References Cited

U.S. PATENT DOCUMENTS

| | | | | |
|---|---|---|---|---|
| 2019/0197112 | A1* | 6/2019 | Kaplan | G06F 40/30 |
| 2020/0110792 | A1 | 4/2020 | Tsabba | |
| 2020/0334268 | A1 | 10/2020 | Vasireddy et al. | |
| 2021/0294291 | A1 | 9/2021 | Murakami et al. | |
| 2021/0294790 | A1* | 9/2021 | Caro | G06F 16/219 |
| 2021/0319030 | A1 | 10/2021 | Guiney | |
| 2025/0061099 | A1 | 2/2025 | Balakrishnan et al. | |

OTHER PUBLICATIONS

Amazon Redshift, "Defining table constraints", Database Developer Guide, [Online]. Retrieved from the Internet: https: web.archive. org web 20231114075125 https: docs.aws.amazon.com redshift latest dg t_Defining_constraints.html, (Accessed online Dec. 23, 2024), 2 pages.

Databricks, "What is Delta Live Tables?", [Online]. Retrieved from the Internet: The Wayback Machine—https: web.archive.org web 20230922115945 https: docs.databricks.com en delta-live-tables index.html, (Accessed online Dec. 23, 2024), 7 pages.

IBM, "Check constraint optimization", [Online]. Retrieved from the Internet: https: www.ibm.com docs en i 7.2?topic=engine-check-constraint-optimization, (Accessed online Dec. 23, 2024), 2 pages.

Microsoft Learn, "Create Trigger Transact SQL", Learn Azure Synapse Analytics, (Dec. 29, 2022), 21 pages.

Microsoft Learn, "Primary key, foreign key, and unique key using dedicated SQL pool in Azure Synapse Analytics", Wayback May 23, 2023, [Online]. Retrieved from the Internet: https: web.archive.org web 20230523220926 https: learn.microsoft.com en-us azure synapse-analytics sql-data-warehouse sql-data-warehouse-table-constraints, (Aug. 18, 2022), 4 pages.

Microsoft Learn, "Design tables using dedicated SQL pool in Azure Synapse Analytics", Wayback Jun. 8, 2023, [Online]. Retrieved from the Internet: https: web.archive.org web 20230608084803 https: learn.microsoft.com en-us azure synapse-analytics sql-data-warehouse sql-data-warehouse-tables-overview#unsupported-table-features, (Accessed online Dec. 23, 2024), 12 pages.

Oracle, "15.1.20.6 Check Constraints", MySQL Documentation Library, [Online]. Retrieved from the Internet: https: docs.oracle. com cd E17952_01 mysql-8.0-en create-table-check-constraints. html 3 3, (Accessed online Feb. 25, 2025), 3 pages.

Oracle, "SQL Language Reference—Insert", Wayback May 29, 2023, [Online]. Retrieved from the Internet: https: web.archive.org web 20230529025230 https: docs.oracle.com en database oracle oracle-database 21 sqlrf INSERT.html, (Accessed online Dec. 23, 2024), 20 pages.

Postgresql, "Documentation 17 5 5 Constraints", Wayback May 27, 2023, [Online]. Retrieved from the Internet: The Wayback Machine—https: web.arch ive. org web 20230527170639 https: www,postgresq l .org docs current dd I-constraints.html, (May 25, 2023), 8 pages.

Sciencedirect Topics, "Critical Data Element an overview", [Online]. Retrieved from the Internet: https: www.sciencedirect.com topics computer-science critical-data-element, (Accessed online Dec. 23, 2024), 11 pages.

"U.S. Appl. No. 18/451,522, Non Final Office Action mailed Jun. 21, 2024", 12 pgs.

"U.S. Appl. No. 18/451,522, Response filed Sep. 23, 2024 to Non Final Office Action mailed Jun. 21, 2024", 12 pgs.

* cited by examiner

BUILT-IN DATA QUALITY MONITORING

TECHNICAL FIELD

The present disclosure generally relates to network-based data systems and, more specifically, data quality monitoring.

BACKGROUND

Data systems, such as database systems, may be provided through a cloud platform, which allows organizations and users to store, manage, and retrieve data from the cloud. A cloud data system (also referred to as a "network-based data system" or simply as a "data system") is a network-based system used for data analysis and reporting that comprises a central repository of integrated data from one or more disparate sources.

The data coming from these disparate sources can cause data errors. Ensuring trustworthiness of data can be important because enterprise users want the assurance that the data presented is correct and certified. Auditing data periodically can fall short of ensuring the trustworthiness of the data. Moreover, auditing typically involves moving the data out of the data system to perform the audit, which can lead to security and privacy concerns.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Described herein are techniques for monitoring data quality in a network-based data system. The techniques can be integrated into the data system (i.e., built-in). The techniques can involve continuous monitoring of the data using scheduled data metric operations, which can be defined as schema level objects. A library of data metric functions can be created and used across an organization (e.g., account) in the data system. The data metric functions can be used across multiple tables and columns, enabling scalability and consistency in the data monitoring capabilities. The data metric functions can be automatically performed in the background, making them manageable and seamless. A central location per account can be provided for storing the monitored metrics, which can be used for dashboarding, reporting, alerting, and trend analysis. Also, data for the account can be protected from third parties while performing the data monitoring operations for security and privacy protection. The techniques can also involve on-demand (e.g., ad-hoc) metric monitoring.

Figure 1:
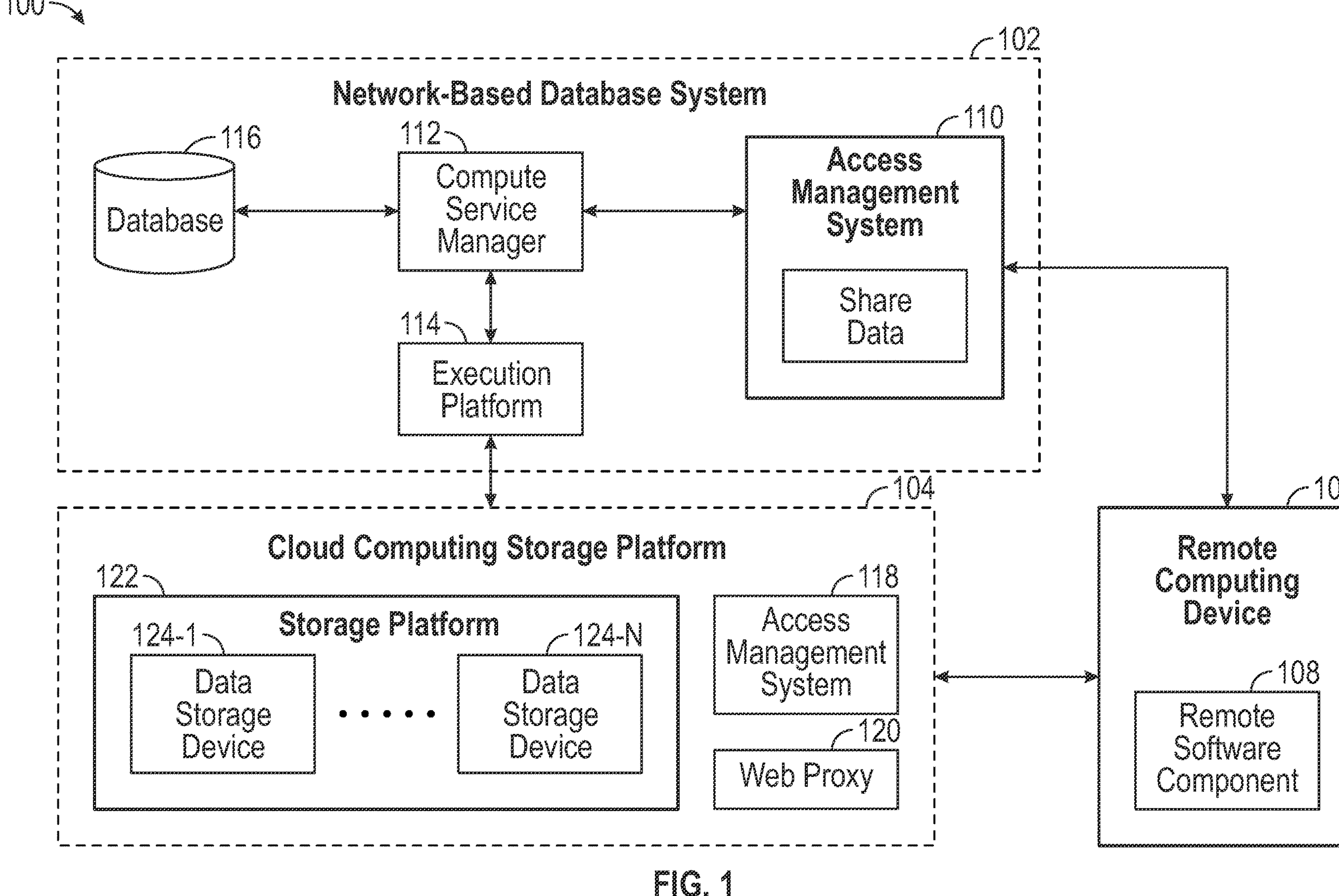
FIG. 1 illustrates an example computing environment, according to some example embodiments.

FIG. 1 illustrates an example shared data processing platform 100. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based database system 102, a cloud computing storage platform 104 (e.g., a storage platform, an AWS® service, Microsoft Azure®, or Google Cloud Services®), and a remote computing device 106. The network-based database system 102 is a cloud database system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based database system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based database system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures.

The network-based database system 102 comprises an access management system 110, a compute service manager 112, an execution platform 114, and a database 116. The access management system 110 enables administrative users to manage access to resources and services provided by the network-based database system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based database system 102, as discussed in further detail below.

The compute service manager 112 coordinates and manages operations of the network-based database system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based database system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-N that are part of a cloud computing storage platform 104. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based database system 102 and the access management system 118 of the cloud computing storage platform 104 can communicate and share information so as to enable access and management of resources and services shared by users of both the network-based database system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based database system 102 based on the changing data storage/retrieval needs as well as the changing needs of the users and systems accessing the shared data processing platform 100. The support of dynamic changes allows network-based database system 102 to scale quickly in response to changing demands on the systems and components within network-based database system 102. The decoupling of the computing resources from the data storage devices 124-1 to 124-N supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based database system 102 is dynamic and supports regular changes to meet the current data processing needs.

During typical operation, the network-based database system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, all computing resources and all cache resources may retrieve data from, and store data to, any of the data storage resources in the cloud computing storage platform 104.

Figure 2:
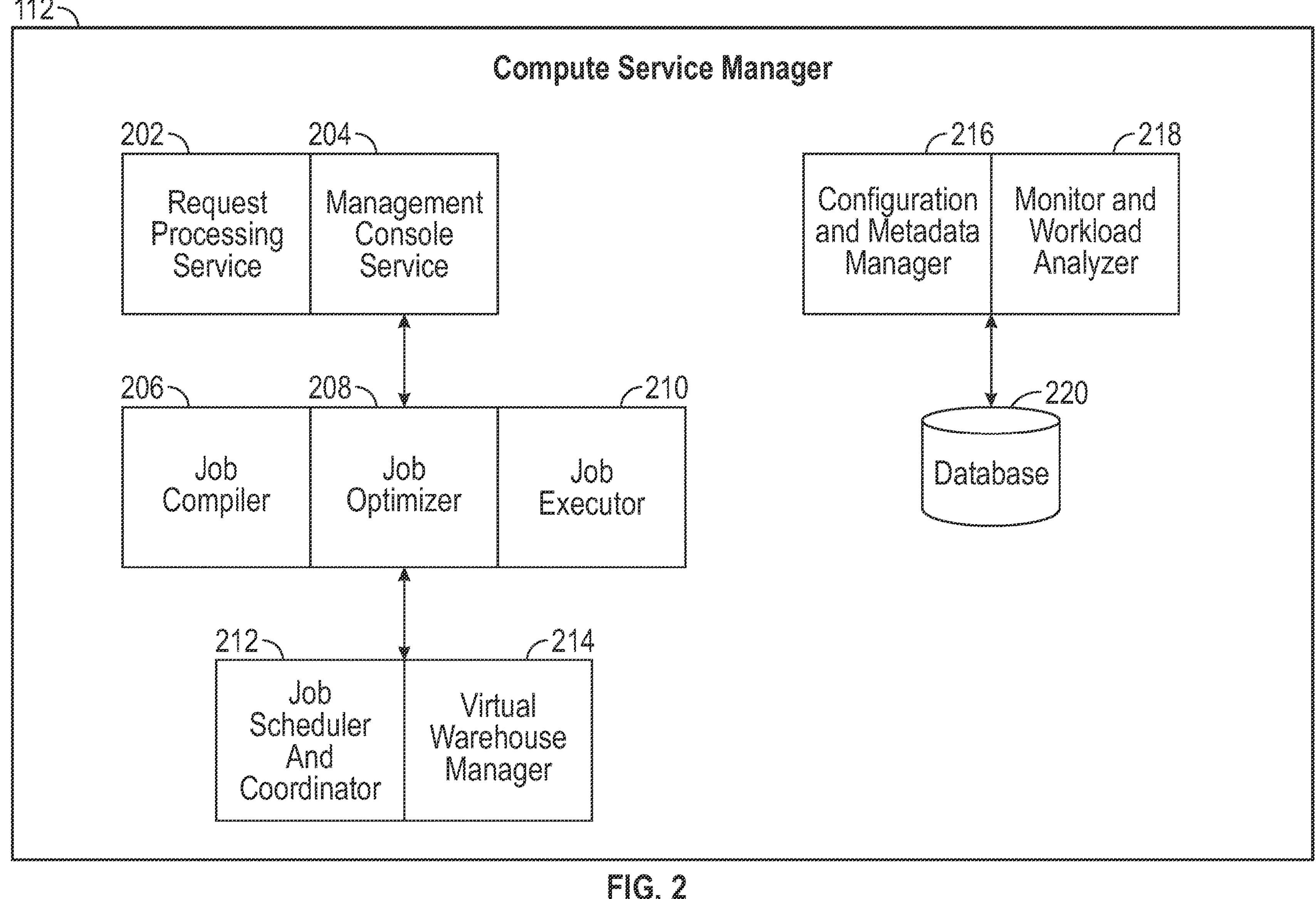
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based database system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based database system 102. For example, data storage device 220 may represent caches in execution platform 114, storage devices in cloud computing storage platform 104, or any other storage device.

Figure 3:
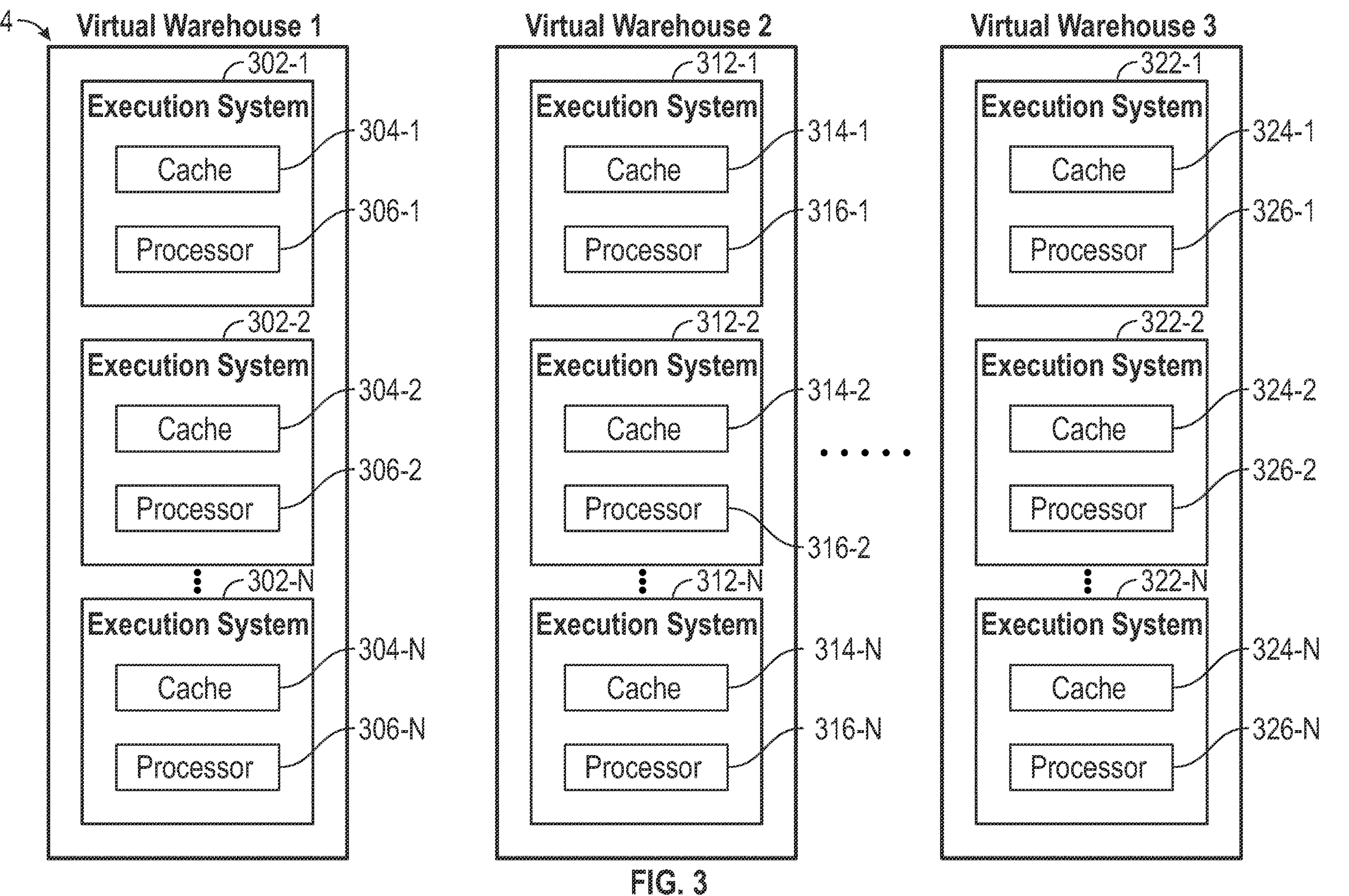
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing storage platform 104. Similarly, each of the execution nodes shown in FIG. 3 can access data from any of the data storage devices 124-1 to 124-N. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

As mentioned above, knowing the health and quality of data stored in the data system is an important aspect of data governance. Unknown state of data can lead to governance and compliance risk. Lack of freshness and trust in the quality of data can lead to slow, poor business decisions. For example, anomalies such as unexpected count of nulls, anomalous volume of records, data not refreshed at expected time, etc., can lead to poor data quality, and poor data quality can cost enterprises time, money, and credibility.

Next, techniques for monitoring data quality in the data system are described. The techniques can be integrated into the data system (i.e., built-in). The techniques can involve continuous monitoring of the data using scheduled data metric operations. A library of data metric functions can be created and used across an organization (i.e., account) using the data system. The data metric functions can be used across multiple tables and columns enabling scalability and consistency. The data metric functions can be automatically performed in the background, making them manageable and seamless. A central location per account can be provided for storing the monitored metrics, which can be used for dashboarding, reporting, alerting, and trend analysis. The techniques can also involve on-demand (e.g., ad-hoc) metric monitoring.

Figure 4:
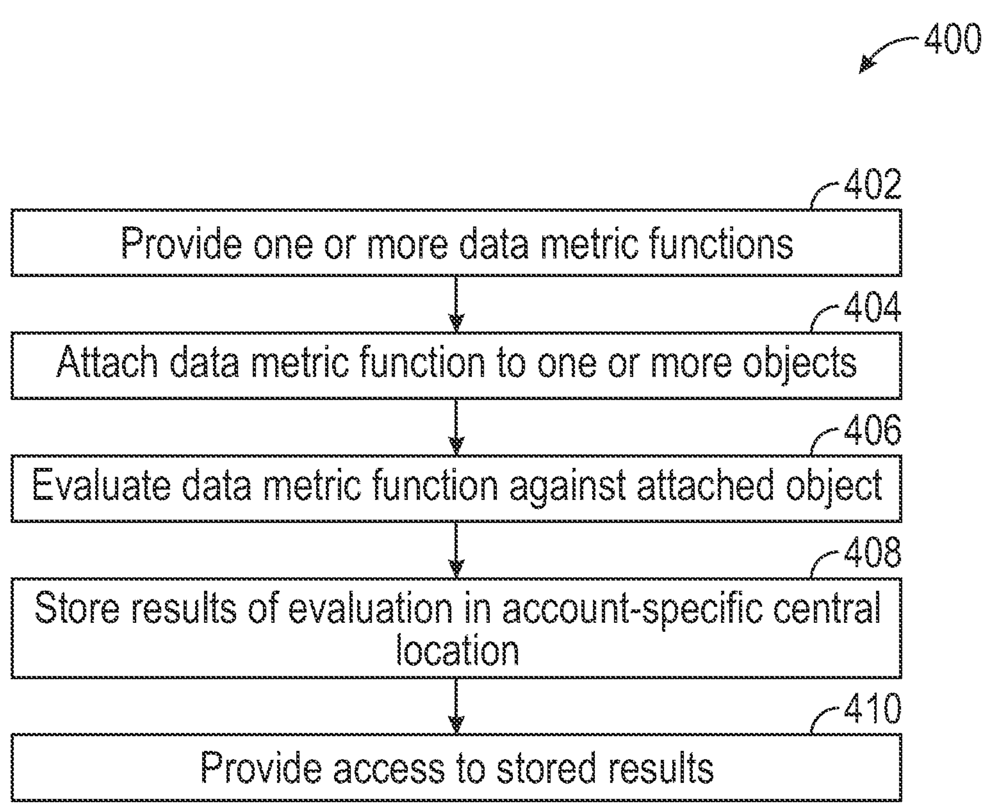
FIG. 4 shows a flow diagram of a method for data metric monitoring, according to some example embodiments.

FIG. 4 shows a flow diagram of a method 400 for data metric monitoring, according to some example embodiments. The method 400 may be embodied in computer-readable instructions for execution by one or more hardware components (e.g., one or more processors) such that the operations of the method 400 may be performed by components of network-based database system 102. Accordingly, the method 400 is described below, by way of example with reference thereto. However, it shall be appreciated that the method 400 may be deployed on various other hardware configurations and is not intended to be limited to deployment within the network-based database system 102.

At operation 402, one or more data metric functions are provided. Data metric functions can monitor respective metrics. Data metric functions can be defined as schema level objects. Data metric function objects reside within the schema similar to tables, views, and other objects. For example, data metric function can include an expression (e.g., SQL expression) to evaluate the quality of a table or view column. The SQL expression can be a SQL statement that returns a scalar value (e.g., select count_if(c is null from arg_t").

The data metric function can measure the quality of the column according to specified rules. The measured metrics can be used to perform validity checks expressed as a Boolean expression. Data metric functions can be flexible to support aggregating an entire table for the metric evaluation or using a subset of rows using condition columns, such as a timestamp column. Examples of data metric functions can include quality checks for data freshness, row counts, null counts, duplicate counts, mean/median/max, and other suitable data metrics. The user may have the appropriate privileges in the data system to create the data metric function as a schema level object.

At operation 404, a data metric function can be attached to one or more objects, such as tables. Because the data metric function is a schema level object, a data metric function can be attached to multiple tables. Also, a table can have multiple data metrics attached to the table. Privilege control may be used to limit which users can attach data metric functions to tables. For example, ownership privilege of the object (e.g., table) and usage privilege of the metric function may be used to attach the metric function. In some examples, a role with account level "apply data metric" privilege may be allowed to attach a data metric function. To attach a metric function, the table owner role may have "execute data metric" account level privilege or usage privilege on the data metric function.

A data metric function can be associated with columns in an object (e.g., table, stream) by ordinal identification. Hence, when a column is renamed, the metric association to the renamed column remains valid. If, however, a column is dropped, the associated metric becomes invalid and cannot be evaluated. In some examples, a metric will be automatically begin performing evaluations upon association. In some examples, a separate command may be used to begin performing evaluations after association.

At operation 406, the data metric function is evaluated against the attached object (e.g., table). As described in further detail below, the data metric function evaluation may be performed based on a set schedule (e.g., every hour, every day). Also, as described in further detail below, the evaluation may be performed in a deterministic manner in some examples. In some examples, the evaluation may be performed using dynamic tables, as described in further detail below. Metric evaluation executes the metric function using the table on identified columns by invoking the metric function.

At operation 408, the results of evaluating the metric function are stored in an account-specific central location. For example, the results may be pipelined into an account-specific database stored in the data system. In some examples, the results from various metric functions performed on various tables in an account are stored in the account-specific central location. Accounts in the database may have respective central locations where data metric function results are stored and accessible for tables associated with respective accounts. The results are pipelined into the account-specific central location so that only account users with the proper privileges have access to the results, maintaining security and privacy protocols.

The data metric function results may be stored using an event table schema. For example, the results may be recorded in an open telemetry format to allow for more robust creation of dashboards and other result views by account users. For example, the schema for the results may include a timestamp column, which includes the time at which the metric is evaluation. The schema for the results may include a resource attribute column, which can include an object describing additional attributes of the metric, such as metric ID, metric name, etc. The schema for the results may also include columns for record type, record, and record attribute, which can include information about the attached object on which the metric was evaluated. The schema for the results can include a value column, which includes the result of the evaluation.

At operation 410, access to the data metric function results stored in the account-specific central location is provided to account users with the proper privileges. In some examples, dashboards may be created to show relevant information from the metric function results using a user interface.

In some examples, a local view of the database storing the metric function results may be generated. The local view may be generated and managed by the data system, and the local view may be provided as a user object. The local view may include columns for: table_ID, table_name, table_schema, table_database, metric_ID, metric_version, metric_name, metric_schema, metric_database, metric_arguments, measurement_time, query_end_time, query_ID, reference_ID, and value.

Figure 5:
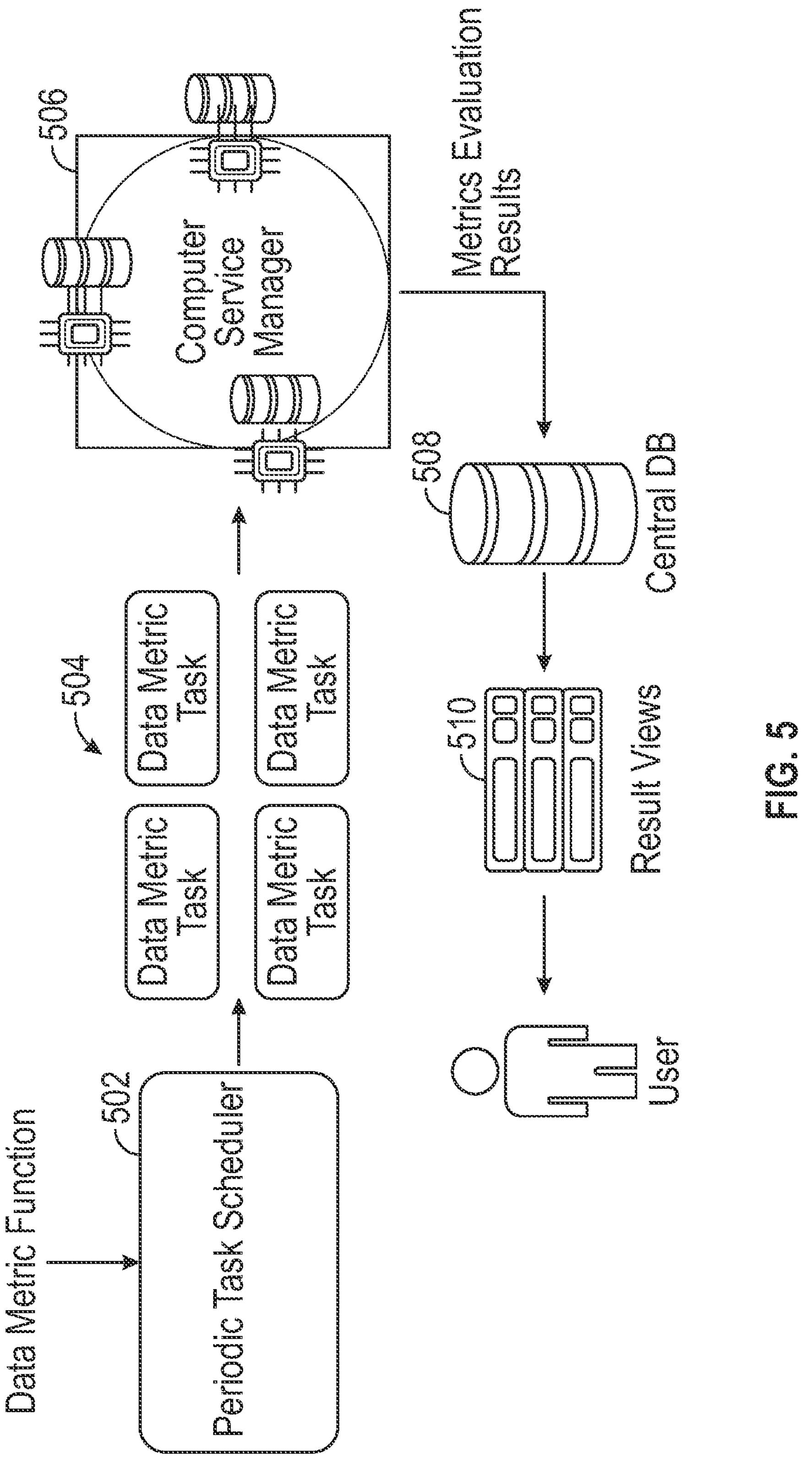
FIG. 5 shows a simplified block diagram for scheduling evaluation of a metric function, according to some example embodiments.

FIG. 5 shows a simplified block diagram for scheduling evaluation of a metric function, according to some example embodiments. A data metric function may be provided to a periodic task scheduler 502. The periodic task scheduler 502 may generate data metric tasks 504 based on the data metric function. The period task scheduler 502 may be running in the background. The periodic task scheduler 502 may scan a data metrics evaluation plan, which is defined by the data metric function and schedule, and generate the data metric tasks 504.

The data metric tasks 504 may be provided to a compute service manager 506 for execution. In some examples, the periodic task scheduler 502 may be provided as a component in the compute service manager 506. The compute service manager 506 may execute the data metric tasks to generate the metric evaluation results.

In some examples, data metric tasks 504 may be executed using serverless compute components. For example, a particular metric association (e.g., null_count on T1.C1) can be evaluated using a serverless compute task. A single serverless compute task execution can be used to evaluate multiple rules on the same table to improve query efficiency.

The metric evaluation results may be stored in a central database 508 for the account (i.e., account-specific central location). The central database 508 may be provided by the data system, but access may be limited to select account users to maintain security and privacy. A data metric pipeline may be executed using a serverless compute task to execute and store the metric evaluation results. A results view 510 (e.g., local view) may be generated using the metric evaluation results stored in the central database 508 to provide a user access to the results.

The metric function may be evaluated in a deterministic manner. The metric function may be evaluated on a specified table version on the scheduled time using stored older versions of the table even if the metric function is executed at a later time as compared to the scheduled time. For example, the data system may take into consideration the workload on the data system in determining when to execute the scheduled metric function and can delay the execution of the metric function based on the workload. Consider an example: a data metric function is scheduled to be evaluated at 8:00 am, but at 8:00 am the workload on the data system may be above a capacity threshold (e.g., heavy workload). For example, multiple users of the data system may be performing resource extensive operations. The data system may delay execution of the metric function to 8:10 am. However, at 8:10 am, the data system may use a table version corresponding to the scheduled 8:00 am when executing the metric function. Older table versions may be stored in a data retention storage for a defined data retention time. Thus, the data system may retrieve the version of the table that existed at 8:00 am when executing the metric function at 8:10 am. The results may be pipelined to a central location of the account.

In some examples, a metric function may be evaluated using a dynamic table. Metric evaluation can be maintained incrementally using a dynamic table or other mechanisms, such as a materialized view. A dynamic table (or other incremental storing mechanism) can store incremental changed row information. The dynamic table can be refreshed to load changed row information from the last refresh time.

Figure 6:
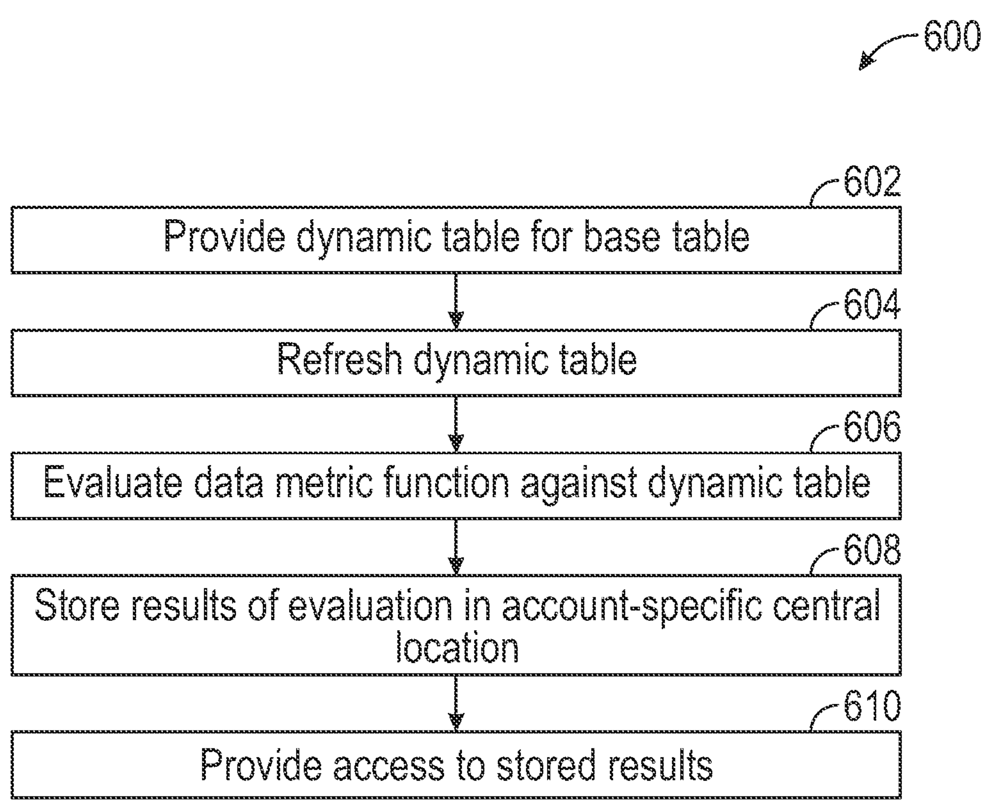
FIG. 6 shows a flow diagram of a method for data metric monitoring using a dynamic table, according to some example embodiments.

FIG. 6 shows a flow diagram of a method 600 for data metric monitoring using a dynamic table, according to some example embodiments. The method 600 may be embodied in computer-readable instructions for execution by one or more hardware components (e.g., one or more processors) such that the operations of the method 600 may be performed by components of network-based database system 102. Accordingly, the method 600 is described below, by way of example with reference thereto. However, it shall be appreciated that the method 600 may be deployed on various other hardware configurations and is not intended to be limited to deployment within the network-based database system 102.

At operation 602, a dynamic table for a base table is provided. A metric function, as described herein, is attached to the base table. The dynamic table can store changed row information of the base table. The dynamic table can be created and maintained as a nested object of the base table. That is, the dynamic table may be a child object of the base table.

At operation 604, the dynamic table is refreshed. The refresh can include loading new changed row information of the base table since the last refresh of the dynamic table. In some examples, the previous changed row information stored in the dynamic table may be removed and the new information may be loaded in the dynamic table. The refresh of the dynamic table may be triggered by the schedule of the metric function. That is, the dynamic table may be refreshed at the scheduled execution time of the metric function evaluation.

At operation 606, the metric function attached to the base table can be evaluated using the refreshed dynamic table. The use of dynamic tables can increase the speed and efficiency of metric function evaluation while lowering cost of performing data metric evaluation at regular intervals. Instead of the metric function being evaluated against the entire base table, the metric function can be evaluated against the refreshed dynamic table, which includes only incremental changed row information and therefore the amount of data in the dynamic table is less than the base table. Consider an example: an initial metric evaluation is performed on base table including 100 rows at time T1. By time T2, which is the next scheduled metric evaluation, 100 additional rows have been added to the base table. Without dynamic tables, the metric function would be executed on the total 200 rows of the base table at time T2. However, with the use of a dynamic table, the number of rows to be scanned for metric evaluation can be reduced. Now, in the dynamic table use case scenario, the dynamic table at time T2 is refreshed to store changed row information of the added 100 rows. The metric function now is executed on the 100 new rows in the dynamic table instead of the total 200 rows of the base table.

At operation 608, the results of evaluating the metric function are stored in an account-specific central location using the techniques described herein. At operation 610, access to the metric function results stored in the account-specific central location may be provided using the techniques described herein.

As described above, the data metric functions can be evaluated using a background process based on a schedule and data evaluation plan. However, creating and maintaining library of data metric functions can also allow ad-hoc evaluation of the data metric functions. For example, data engineers can be building components in the data system to move data within an account and may wish to test the components in real time.

Figure 7:
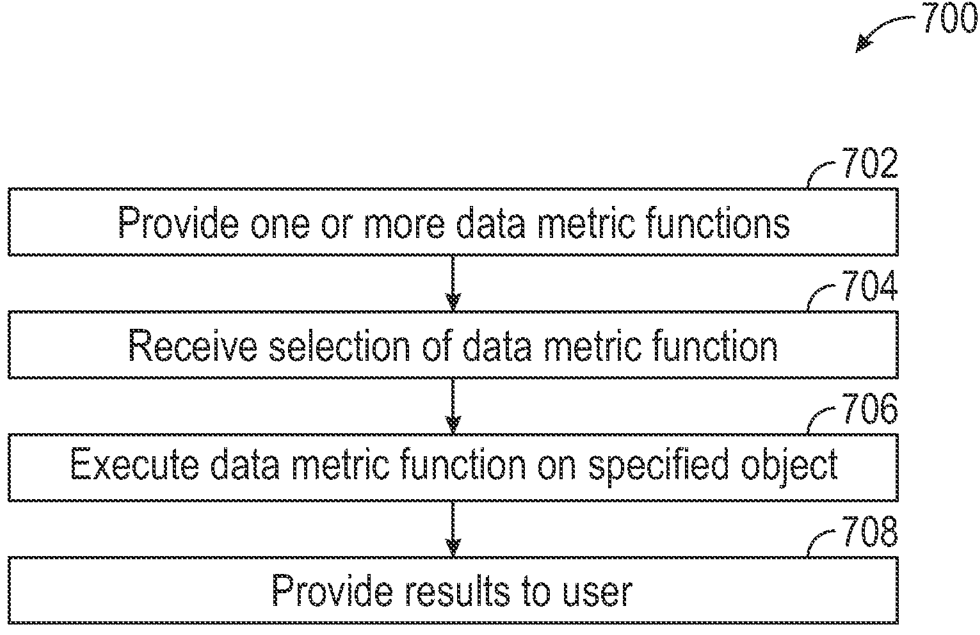
FIG. 7 shows a flow diagram of a method for ad-hoc data metric monitoring, according to some example embodiments.

FIG. 7 shows a flow diagram of a method 700 for ad-hoc data metric monitoring, according to some example embodiments. At operation 702, one or more data metric functions are provided. For example, a library of data metric functions may be provided. The data metric functions are defined as schema level objects, as described herein.

At operation 704, the data system can receive a selection of data metric function from the library to execute on specified object (e.g., table). The selection may be received from a user (e.g., data engineer) with the appropriate privileges as described herein.

At operation 706, the selected data metric function can be executed like a query on the specified object (e.g., table). At operation 708, the results of the data metric function execution can be provided to the user as query results. Instead of the results being pipelined to an account-specific central location when the data metric evaluation is performed in the background, the results are directly provided to the user for ad-hoc evaluation as query results.

Figure 8:
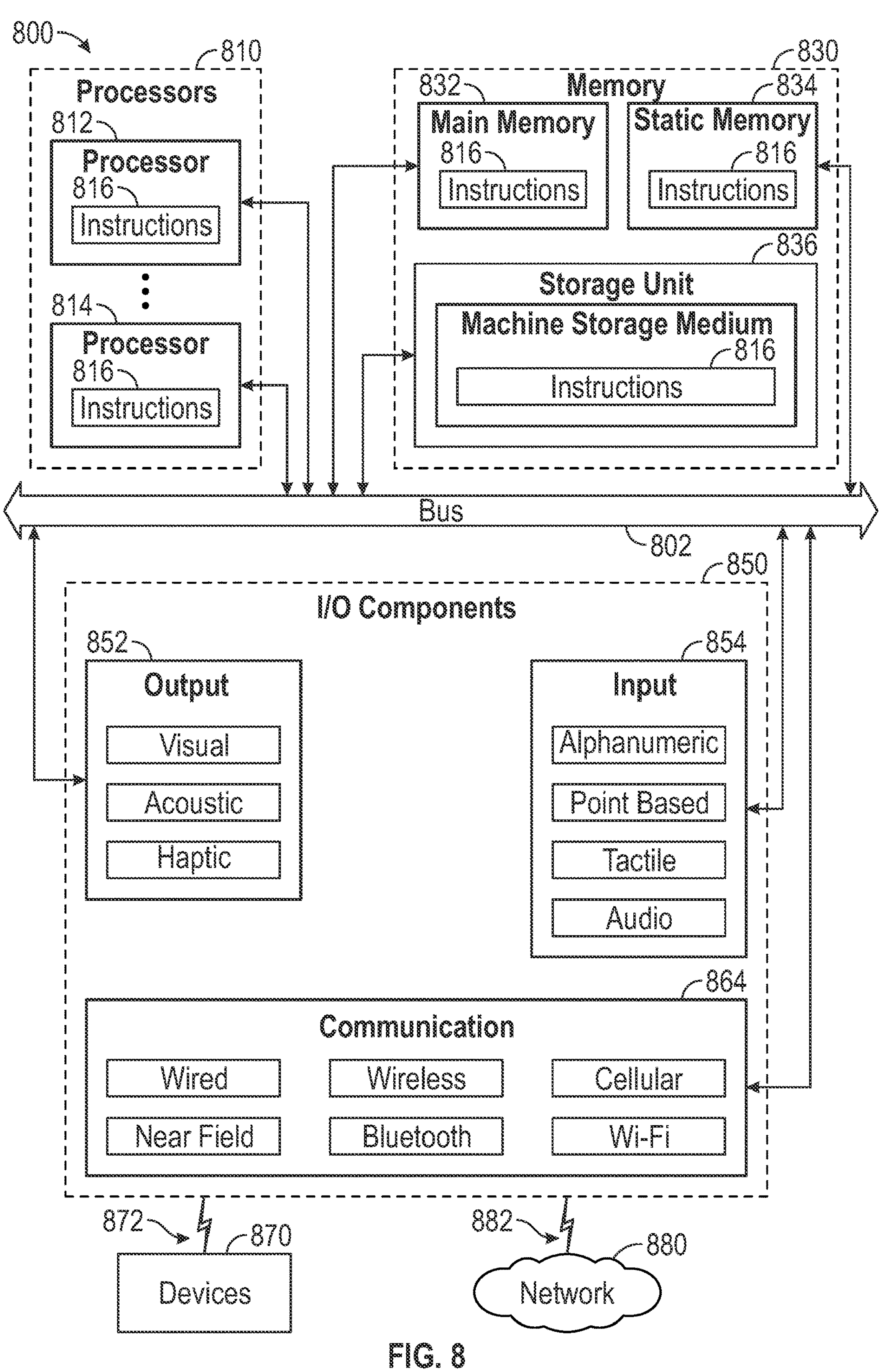
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of any one or more of the methods described herein. As another example, the instructions 816 may cause the machine 800 to implement portions of the data flows described herein. In this way, the instructions 816 transform a general, non-programmed machine into a particular machine 800 (e.g., the remote computing device 106, the access management system 118, the compute service manager 112, the execution platform 114, the access management system 110, the Web proxy 120, remote computing device 106) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the remote computing device 106, the access management system 118, the compute service manager 112, the execution platform 114, the access management system 110, the Web proxy 120, and the devices 870 may include any other of these systems and devices.

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1. A method comprising: storing a data metric function to evaluate data quality in a network-based data system, the data metric function being defined as a schema level object; attaching the data metric function to a table associated with an account in the network-based data system; evaluating, by at least one hardware processor, the data metric function on data associated with the table to generate evaluation results; storing the evaluation results in an account-specific central database in the network-based data system; and providing access to the evaluation results in the account-specific central database to a user of the account.

Example 2. The method of example 1, further comprising: setting a schedule for data metric evaluation for the table, wherein evaluating the data metric function is performed based on the schedule.

Example 3. The method of any of examples 1-2, further comprising: executing the data metric function at a later time than a scheduled time using a stored version of the table corresponding to the scheduled time.

Example 4. The method of any of examples 1-3, wherein the data metric function is executed on a dynamic table associated with the table.

Example 5. The method of any of examples 1-4, further comprising: refreshing the dynamic table based on a scheduled time associated with the data metric function; and executing the data metric function on the refreshed dynamic table to generate the evaluation results.

Example 6. The method of any of examples 1-5, wherein the data metric function is a first data metric function, the method further comprising: attaching a second data metric function to the table.

Example 7. The method of any of examples 1-6, wherein the table is a first table and the account is a first account, and wherein the data metric function is attached to a second table associated with a second account in the network-based data system.

Example 8. A system comprising: one or more processors of a machine; and a memory storing instructions that, when executed by the one or more processors, cause the machine to perform operations implementing any one of example methods 1 to 7.

Example 9. A machine-readable storage device embodying instructions that, when executed by a machine, cause the machine to perform operations implementing any one of example methods 1 to 7.

What is claimed is:

1. A method comprising:

providing a base table within an account in network-based data system;

storing a data metric function to evaluate data quality in the network-based data system, the data metric function being defined as a schema level object;

providing a dynamic table within the account storing incremental change row information of the base table, the dynamic table being a nested child object of the base table;

attaching the data metric function to the base table associated in the network-based data system;

refreshing the dynamic table to load new changed row information of the base table since a last refresh of the dynamic table;

evaluating, by at least one hardware processor, the data metric function against the refreshed dynamic table to generate evaluation results, an amount of data in the dynamic table being less than an amount of data in the base table;

storing the evaluation results in an account-specific central location in the network-based data system; and providing access to the evaluation results in the account-specific central location to a user of the account.

2. The method of claim 1, further comprising:

setting a schedule for data metric evaluation for the table, wherein evaluating the data metric function is performed based on the schedule.

3. The method of claim 2, further comprising:

executing the data metric function at a later time than a scheduled time using a stored version of the table corresponding to the scheduled time.

4. The method of claim 1, wherein the refreshing of the dynamic table is performed based on a scheduled time associated with the data metric function.

5. The method of claim 1, wherein the data metric function is a first data metric function, the method further comprising:

attaching a second data metric function to the table.

6. The method of claim 1, wherein the table is a first table and the account is a first account, and wherein the data metric function is attached to a second table associated with a second account in the network-based data system.

7. A machine-storage medium embodying instructions that, when executed by a machine, cause the machine to perform operations comprising:

providing a base table within an account in network-based data system;

storing a data metric function to evaluate data quality in the network-based data system, the data metric function being defined as a schema level object;

providing a dynamic table within the account storing incremental change row information of the base table, the dynamic table being a nested child object of the base table;

attaching the data metric function to the base table associated in the network-based data system;

refreshing the dynamic table to load new changed row information of the base table since a last refresh of the dynamic table;

evaluating the data metric function against the refreshed dynamic table to generate evaluation results, an amount of data in the dynamic table being less than an amount of data in the base table;

storing the evaluation results in an account-specific central location in the network-based data system; and providing access to the evaluation results in the account-specific central location to a user of the account.

8. The machine-storage medium of claim 7, further comprising:

setting a schedule for data metric evaluation for the table, wherein evaluating the data metric function is performed based on the schedule.

9. The machine-storage medium of claim 8, further comprising:

executing the data metric function at a later time than a scheduled time using a stored version of the table corresponding to the scheduled time.

10. The machine-storage medium of claim 7, wherein the refreshing of the dynamic table is performed based on a scheduled time associated with the data metric function.

11. The machine-storage medium of claim 7, wherein the data metric function is a first data metric function, the machine-storage medium further comprising:

attaching a second data metric function to the table.

12. The machine-storage medium of claim 7, wherein the table is a first table and the account is a first account, and wherein the data metric function is attached to a second table associated with a second account in the network-based data system.

13. A system comprising:

at least one hardware processor; and at least one memory storing instructions that, when executed by the at least one hardware processor, cause the at least one hardware processor to perform operations comprising:

providing a base table within an account in network-based data system;

storing a data metric function to evaluate data quality in the network-based data system, the data metric function being defined as a schema level object;

providing a dynamic table within the account storing incremental change row information of the base table, the dynamic table being a nested child object of the base table;

attaching the data metric function to the base table associated in the network-based data system;

refreshing the dynamic table to load new changed row information of the base table since a last refresh of the dynamic table;

evaluating the data metric function against the refreshed dynamic table to generate evaluation results, an amount of data in the dynamic table being less than an amount of data in the base table;

storing the evaluation results in an account-specific central location in the network-based data system; and providing access to the evaluation results in the account-specific central location to a user of the account.

14. The system of claim 13, the operations further comprising:

setting a schedule for data metric evaluation for the table, wherein evaluating the data metric function is performed based on the schedule.

15. The system of claim 14, the operations further comprising:

executing the data metric function at a later time than a scheduled time using a stored version of the table corresponding to the scheduled time.

16. The system of claim 15, the operations further comprising:

wherein the refreshing of the dynamic table is performed based on a scheduled time associated with the data metric function.

17. The system of claim 13, wherein the data metric function is a first data metric function, the operations further comprising:

attaching a second data metric function to the table.

18. The system of claim 13, wherein the table is a first table and the account is a first account, and wherein the data metric function is attached to a second table associated with a second account in the network-based data system.

* * * * *